(12) United States Patent
Hong et al.

(10) Patent No.: US 9,976,062 B2
(45) Date of Patent: *May 22, 2018

(54) PRESSURE SENSITIVE ADHESIVE COMPOSITION

(71) Applicant: LG Chem, Ltd., Seoul (KR)

(72) Inventors: Sang Hyun Hong, Daejeon (KR); Sung Soo Yoon, Daejeon (KR); Min Ki Lee, Daejeon (KR); Su Jeong Kim, Daejeon (KR); Jeong Ae Yoon, Daejeon (KR); Han Na Chi, Daejeon (KR)

(73) Assignee: LG Chem, Ltd. (KR)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/765,696

(22) PCT Filed: Nov. 19, 2014

(86) PCT No.: PCT/KR2014/011108
§ 371 (c)(1),
(2) Date: Aug. 4, 2015

(87) PCT Pub. No.: WO2015/076548
PCT Pub. Date: May 28, 2015

(65) Prior Publication Data
US 2015/0376474 A1 Dec. 31, 2015

(30) Foreign Application Priority Data

Nov. 19, 2013 (KR) .................. 10-2013-0140926
Nov. 19, 2014 (KR) .................. 10-2014-0161373

(51) Int. Cl.
| | | |
|---|---|---|
| C09J 153/00 | (2006.01) | |
| C09J 201/02 | (2006.01) | |
| G02B 5/30 | (2006.01) | |
| C09J 133/10 | (2006.01) | |

(52) U.S. Cl.
CPC .............. *C09J 133/10* (2013.01); *C09J 7/22* (2018.01); *C09J 7/38* (2018.01); *C09J 153/00* (2013.01); *G02B 5/30* (2013.01); *C09J 2203/318* (2013.01); *C09J 2453/00* (2013.01); *C09J 2453/003* (2013.01)

(58) Field of Classification Search
CPC ...... C09J 133/10; C09J 153/00; C09J 7/0221; C09J 7/0246; C09J 2203/318; C09J 2453/00; C09J 2453/003; G02B 5/30
See application file for complete search history.

(56) References Cited

U.S. PATENT DOCUMENTS

| | | | | |
|---|---|---|---|---|
| 8,039,104 B2 * | 10/2011 | Everaerts | .................. | B32B 7/06 428/355 AC |
| 9,315,697 B2 * | 4/2016 | Kim | .................... | C09J 153/005 |
| 9,798,056 B2 * | 10/2017 | Lee | .................. | G02B 5/3025 |
| 2003/0119970 A1 * | 6/2003 | Husemann | .......... | C08F 293/005 524/505 |
| 2008/0011419 A1 | 1/2008 | Everaerts et al. | | |
| 2009/0305068 A1 | 12/2009 | Morishita et al. | | |
| 2014/0242303 A1 * | 8/2014 | Lee | ..................... | G02B 5/3025 428/1.55 |
| 2015/0062503 A1 * | 3/2015 | Yoon | ................... | C09J 153/005 349/96 |
| 2015/0086781 A1 * | 3/2015 | Chi | ........................ | C08K 5/105 428/354 |
| 2016/0145475 A1 * | 5/2016 | Lee | ...................... | C09J 133/04 428/1.31 |

FOREIGN PATENT DOCUMENTS

| | | |
|---|---|---|
| CN | 1222179 A | 7/1999 |
| JP | 07-082542 | 3/1995 |
| JP | H10298248 A | 11/1998 |
| JP | 11-116644 | 4/1999 |
| JP | 2001-131250 | 5/2001 |
| JP | 2009-079120 | 4/2009 |
| JP | 2012-237965 | 12/2012 |
| JP | 5948721 B2 | 7/2016 |
| KR | 10-1023839 A | 3/2011 |
| KR | 10-1171976 B1 | 8/2012 |
| KR | 10-1171977 B1 | 8/2012 |
| TW | 200837388 A | 9/2008 |
| TW | 200925169 A | 6/2009 |
| WO | 2012126724 A1 | 9/2012 |
| WO | WO-2013/180524 A1 * | 12/2013 |
| WO | WO-2014/178674 A1 * | 11/2014 |

OTHER PUBLICATIONS

Machine translation of JP07082542 downloaded Jun. 24, 2016.*
Office Action from Taiwan Application No. 103140076, dated Oct. 14, 2015.
International Search Report for Application No. PCT/KR2014/011108 dated Feb. 24, 2015.
Extended Search Report from European Application No. 14863100.5, dated Jul. 8, 2016.

* cited by examiner

*Primary Examiner* — Irina S Zemel
*Assistant Examiner* — Jeffrey S Lenihan
(74) *Attorney, Agent, or Firm* — Lerner, David, Littenberg, Krumholz & Mentlik, LLP

(57) ABSTRACT

The present applicant relates to a pressure-sensitive adhesive composition, and optical laminate, a polarizing plate, and a display device. In an embodiment of the present applicant, the pressure-sensitive adhesive composition capable of forming a pressure-sensitive adhesive which has an excellent cohesive force or stress relaxation property, and thus has superior endurance reliability and light leakage suppression performance or the like may be provided. The pressure-sensitive adhesive composition according to an embodiment of the present applicant may be used, for example, for an optical film such as a polarizing plate or the like.

10 Claims, No Drawings

PRESSURE SENSITIVE ADHESIVE COMPOSITION

CROSS-REFERENCE TO RELATED APPLICATION

This application is a national phase entry under 35 U.S.C. § 371 of International Application No. PCT/KR2014/011108, filed Nov. 19, 2014, which claims priority to Korean Patent Application No. 10-2013-0140926, filed Nov. 19, 2013 and Korean Patent Application No. 10-2014-0161373, filed Nov. 19, 2014, the disclosures of which are incorporated herein by reference.

FIELD

The present applicant relates to a pressure-sensitive adhesive composition, an optical laminate, a polarizing plate, and a display device.

BACKGROUND

A pressure-sensitive adhesive may be used for various purposes. For example, the pressure-sensitive adhesive may be used to adhere an optical film such as a polarizing plate, a retardation film, or the like to a display device such as a liquid crystal display device (hereinafter, referred to as an "LCD device"), or may be used to laminate optical films such as the polarizing plate, the retardation film, or the like. Likewise, the pressure-sensitive adhesive used in the optical film or the like is required to have an excellent cohesive force, pressure-sensitive adhesive force, re-workability, low light leakage properties, or the like together with excellent transparency. For example, the pressure-sensitive adhesive compositions for optical films as described above have been proposed in Patent Documents 1 to 3.

Patent Document 1: Korean Patent Publication No. 1023839

Patent Document 2: Korean Patent Publication No. 1171976

Patent Document 3: Korean Patent Publication No. 1171977

DESCRIPTION

Object

The present applicant is directed to providing a pressure-sensitive adhesive composition, an optical laminate, a polarizing plate, and a display device.

Solution

According to an aspect of the present applicant, an illustrative pressure-sensitive adhesive composition may include a block copolymer. The term "block copolymer" used in the present specification may refer to a copolymer including blocks of different polymerized monomers.

In an embodiment of the present applicant, the block copolymer may include a first block having a glass transition temperature of 50° C. or more, and a second block having a glass transition temperature of −10° C. or less. In the embodiment of the present applicant, a "glass transition temperature of a predetermined block" in the present specification may denote a glass transition temperature measured from a polymer only formed of monomers included in the block. In the embodiment of the present applicant, the first block may have a glass transition temperature of 60° C. or more, 65° C. or more, or 70° C. or more. Further, the upper limit of the glass transition temperature of the first block is not particularly limited, but may be, for example, about 150° C., 140° C., 130° C., or 120° C. Further, in another embodiment of the present applicant, a glass transition temperature of the second block may be −20° C. or less, −30° C. or less, −35° C. or less, −40° C. or less, or −45° C. or less. The lower limit of the glass transition temperature of the second block is not particularly limited, but may be, for example, about −80° C. or more, −70° C. or more, −60° C. or more, or −55° C. or more. The block copolymer including the two types of the blocks at least, for example, may form a fine phase separation structure within the pressure-sensitive adhesive. The above-described block copolymer exhibits a suitable cohesive force and stress relaxation properties according to a temperature change, and thus may form a pressure-sensitive adhesive in which physical properties required to be used in an optical film such as endurance reliability, light leakage suppression performance properties, re-workability, and the like are excellently maintained.

The block copolymer may have a number average molecular weight in a range from 200,000 to 500,000. The term "number average molecular weight", "weight-average molecular weight", or "molecular weight distribution (PDI)" used in the present specification may denote a conversion value of standard polystyrene measured by GPC (gel permeation chromatography). In another embodiment of the present applicant, the block copolymer may have a number average molecular weight of 220,000 or more, 250,000 or more, or 300,000 or more. Further, in another embodiment of the present applicant, the block copolymer may have a number average molecular weight of about 450,000 or less, or about 400,000 or less. When the number average molecular weight of the block copolymer is maintained in the above range, the pressure-sensitive adhesive exhibiting superior light leakage suppression performance and re-workability as well as excellent durability under highly severe conditions in which high temperature and high humidity conditions, and room temperature and low humidity conditions are repeated as well as under general severe conditions of high temperature or high temperature and high humidity may be provided.

The block copolymer may have a molecular weight distribution (PDI; Mw/Mn), in other words, a ratio (Mw/Mn) of a weight-average molecular weight (Mw) and a number average molecular weight (Mn) in a range from 2.0 to 5.0. In another embodiment of the present applicant, the ratio (Mw/Mn) may be 2.5 or more, or 3.0 or more. Further, in another embodiment of the present applicant, the ratio (Mw/Mn) may be about 4.5 or less. With the molecular weight distribution in the above range, durability, light leakage suppression performance, and re-workability of the pressure-sensitive adhesive may be further improved.

In the embodiment of the present applicant, the first block included in the block copolymer may have a number average molecular weight in a range from 10,000 to 250,000. The number average molecular weight of the first block, for example, may denote a number average molecular weight of a polymer prepared by polymerizing only monomers forming the first block. In the embodiment of the present applicant, the number average molecular weight of the first block may be 15,000 or more, or 20,000 or more. Further, in another embodiment of the present applicant, the number average molecular weight of the first block may be 200,000 or less, or 180,000 or less.

The block copolymer may be made to have a viscosity in the predetermined range. For example, the block copolymer may have a room temperature viscosity of 3,000 cP or more, or in a range from about 3,000 cP to 8,000 cP measured in a state in which the block copolymer is diluted with ethyl acetate such that contents of solid fractions of the block copolymer are 30 wt %. The term "room temperature" used in the present specification may denote a temperature in its natural state which is not heated or cooled, and may denote a temperature in a range from about 10 to 30° C., 15 to 30° C., 20 to 30° C., 25° C. or 22° C. When the viscosity of the block copolymer is adjusted as described above, durability, light leakage suppression performance, and re-workability of the pressure-sensitive adhesive may be further improved.

In the embodiment of the present applicant, the block copolymer may be a crosslinkable copolymer having a crosslinkable functional group. Examples of the crosslinkable functional group may include a hydroxy group, a carboxyl group, an isocyanate group, a glycidyl group, or the like, and for example, a hydroxy group may be used as the crosslinkable functional group.

When a crosslinkable functional group is included, the functional group may be included, for example, in the second block having a low glass transition temperature. In the embodiment of the present applicant, the crosslinkable functional group may not be included in the first block having a high glass transition temperature and only included in the second block. When the crosslinkable functional group is included in the second block, the pressure-sensitive adhesive exhibiting a suitable cohesive force and stress relaxation properties according to a temperature change, and thus allowing physical properties required to be used in an optical film such as endurance reliability, light leakage suppression performance properties, re-workability, and the like to be excellently maintained may be formed.

In the block copolymer, types of monomers forming the first or second block are not particularly limited as long as the crosslinkable functional group is introduced to a suitable site by a combination of each monomer, and a glass transition temperature of each block and a number average molecular weight of the copolymer is suitablely adjusted.

In the embodiment of the present applicant, the first block may include a polymerization unit derived from a (meth) acrylic acid ester monomer. That a monomer is included as a polymerized unit in a polymer or block may denote that the monomer forms a frame, for example, a main chain or side chain of the polymer or block through a polymerization reaction in the present specification. As the (meth)acrylic acid ester monomer, for example, an alkyl (meth)acrylate may be used. In the embodiment of the present applicant, an alkyl (meth)acrylate having an alkyl group with 1 to 20 carbon atoms, 1 to 16 carbon atoms, 1 to 12 carbon atoms, 1 to 8 carbon atoms, or 1 to 4 carbon atoms may be used in consideration of a cohesive force, a glass transition temperature, and pressure-sensitive adhesive properties. Examples of the monomer may include methyl (meth) acrylate, ethyl (meth)acrylate, n-propyl (meth)acrylate, isopropyl (meth)acrylate, n-butyl (meth)acrylate, t-butyl (meth) acrylate, sec-butyl (meth)acrylate, pentyl (meth)acrylate, 2-ethylhexyl(meth)acrylate, 2-ethylbutyl (meth)acrylate, n-octyl (meth)acrylate, isobornyl (meth)acrylate, isooctyl (meth)acrylate, isononyl (meth)acrylate, lauryl (meth)acrylate, and the like, and one or two types thereof may be selected and used such that the glass transition temperature is ensured. In consideration of easy control of the glass transition temperature, examples of the monomer forming the first block may include an alkyl methacrylate having an alkyl group with 1 to 20 carbon atoms, 1 to 16 carbon atoms, 1 to 12 carbon atoms, 1 to 8 carbon atoms, or 1 to 4 carbon atoms, but is not particularly limited thereto.

The second block of the block copolymer, for example, includes a polymerization unit derived from 90 to 99.9 parts by weight of a (meth)acrylic acid ester monomer, and 0.1 to 10 parts by weight of a copolymerizable monomer having a crosslinkable functional group. The unit "parts by weight" used in the present specification may denote a weight ratio between the components. For example, that the second block includes a polymerization unit derived from 90 to 99.9 parts by weight of a (meth)acrylic acid ester monomer, and 0.1 to 10 parts by weight of a copolymerizable monomer having a crosslinkable functional group as described above may denote the case in which a ratio based on the weights of the (meth)acrylic acid ester monomer A and copolymerizable monomer having a crosslinkable functional group B forming a polymerized unit of the second block may range from 90 to 99.9:0.1 to 10.

As the (meth)acrylic acid ester monomer forming the second block, a type of the monomer capable of finally ensuring the glass transition temperature in the above-described range through copolymerization with the copolymerizable monomer may be selected from the monomers which may be included in the first block and used. In consideration of easy control of the glass transition temperature, examples of the (meth)acrylic acid ester monomer forming the second block may include an acrylic acid ester monomer in the above-described monomer, for example, alkyl acrylate having an alkyl group with 1 to 20 carbon atoms, 1 to 16 carbon atoms, 1 to 12 carbon atoms, 1 to 8 carbon atoms, or 1 to 4 carbon atoms, but is not particularly limited thereto.

As the copolymerizable monomer having a crosslinkable functional group, for example, a monomer such as the (meth)acrylic acid ester monomer having a portion copolymerizable with another monomer included in the block copolymer may be used. Further, when the above-described monomer having a crosslinkable functional group is used, a pressure-sensitive adhesive exhibiting a suitable cohesive force and stress relaxation properties according to a temperature change, and thus having excellent endurance reliability, light leakage suppression performance properties, workability, and the like may be formed. Further, in the embodiment of the present applicant, as the crosslinkable functional group, for example, a hydroxy group or the like may be used, and in this case, the functional group such as the hydroxy group allows an anti-static agent included in the pressure-sensitive adhesive to be evenly dispersed, and thus a change of the anti-static performance of the pressure-sensitive adhesive over time may be minimized.

The copolymerizable monomers having a crosslinkable functional group as described above are variously known in the production field of the pressure-sensitive adhesive, and all the above monomer may be used for the polymer. For example, examples of the copolymerizable monomer having a hydroxy group may include a hydroxyalkyl (meth)acrylate such as 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate or the like, or a hydroxyalkyleneglycol (meth)acrylate such as 2-hydroxyethyleneglycol (meth)acrylate, 2-hydroxypropyleneglycol (meth)acrylate, or the like, but is not limited thereto. In consideration of reactivity with another monomer forming the second block, easy control of the glass transition temperature, or the like, a hydroxyalkyl acrylate, hydroxyalkyleneglycol acrylate, or the like from the above-described monomers may be used, but the monomer is not limited thereto.

The first block and/or the second block, as necessary, for example, may further include any other comonomers as necessary for control of the glass transition temperature, and the monomer may be included as a polymerization unit. Examples of the comonomer may include a nitrogen-containing monomer such as (meth)acrylonitrile, (meth)acrylamide, N-methyl (meth)acrylamide, N-butoxy methyl(meth)acrylamide, N-vinyl pyrrolidone, N-vinyl caprolactam, or the like; an alkyleneoxide group-containing monomer such as alkoxy alkyleneglycol (meth) an acrylic acid ester, alkoxy dialkyleneglycol(meth) an acrylic acid ester, alkoxy trialkyleneglycol (meth) an acrylic acid ester, alkoxy tetraalkyleneglycol (meth) an acrylic acid ester, alkoxy polyethyleneglycol (meth) an acrylic acid ester, phenoxy alkyleneglycol (meth) an acrylic acid ester, phenoxy dialkyleneglycol (meth) an acrylic acid ester, phenoxy trialkyleneglycol (meth)acrylic acid ester, phenoxy tetraalkyleneglycol (meth) an acrylic acid ester, phenoxy polyalkyleneglycol (meth) an acrylic acid ester, or the like; a styrene-based monomer such as styrene or methyl styrene; a glycidyl group-containing monomer such as glycidyl (meth)acrylate; or carboxylic acid vinyl ester such as vinyl acetate, or the like, but are not limited thereto. One type or two or more types may be suitably selected from the above-described monomers as necessary and included in the polymer. The comonomer may be included in a ratio of 20 parts by weight or less, or 0.1 to 15 parts by weight with respect to other monomers in each block in the block copolymer.

The block copolymer, for example, may include 10 to 50 parts by weight of the first block, and 50 to 90 parts by weight of the second block. When a weight ratio of the first block and second block is adjusted as described above, the pressure-sensitive adhesive composition and the pressure-sensitive adhesive having excellent physical properties may be provided. In another embodiment of the present applicant, the block copolymer may include 5 to 45 parts by weight of the first block and 55 to 95 parts by weight of the second block; 5 to 45 parts by weight of the first block and 60 to 95 parts by weight of the second block; or 5 to 40 parts by weight of the first block and 60 to 95 parts by weight of the second.

In the embodiment of the present applicant, the block copolymer may be a diblock copolymer including the first and second blocks, in other word, a diblock copolymer including only two blocks of the first and second blocks. When the diblock copolymer is used, endurance reliability, stress relaxation properties, re-workability, or the like of the pressure-sensitive adhesive may be further excellently maintained.

A method of producing the block copolymer is not particularly limited, and a general method may be used for the production. The block polymer, for example, may be polymerized using a living radical polymerization (LRP) method. As the example, an anion polymerization method of synthesis using an organic rare-earth metal composite as a polymerization initiator, or using an organic alkali metal compound as a polymerization initiator in the presence of an inorganic acid such as an alkali metal, alkali earth metal salts, or the like, an anion polymerization method of synthesis using an organic alkali metal compound as a polymerization initiator in the presence of an organic aluminum compound, an atom transfer radical polymerization (ATRP) method using an atom transfer radical polymer as a polymerization controlling agent, an atom transfer radical polymerization (ATRP) method of activators regenerated by electron transfer (ARGET) using an atom transfer radical polymer as a polymerization controlling agent and performing polymerization in the presence of an organic or inorganic reductant which generates electrons, an atom transfer radical polymerization (ATRP) method of initiators for continuous activator regeneration (ICAR), a reversible addition-fragmentation chain transfer (RAFT) polymerization method using an inorganic reductant reversible addition-fragmentation chain transfer agent, a method using an organic tellurium compound as an initiator, or the like may be used, and a suitable method may be selected from the above-described methods and applied.

The pressure-sensitive adhesive composition may further include a crosslinking agent capable of crosslinking the block copolymer. As the crosslinking agent, a crosslinking agent having at least two functional groups capable of reacting with a crosslinkable functional group included in the block copolymer. Examples of the crosslinking agent may include an isocyanate crosslinking agent, an epoxy crosslinking agent, an aziridine crosslinking agent, a metal chelate crosslinking agent, or the like, and for example, an isocyanate crosslinking agent may be used.

Examples of the isocyanate crosslinking agent may include a diisocyanate compound such as tolylene diisocyanate, xylene diisocyanate, diphenylmethane diisocyanate, hexamethylene diisocyanate, isoboron diisocyanate, tetramethylxylene diisocyanate, naphthalene diisocyanate, or the like, or a compound prepared through a reaction of the diisocyanate compound and a polyol, and as the polyol, for example, trimethylol propane, or the like may be used.

One type or two or more types from the above-described crosslinking agents may be used in the pressure-sensitive adhesive composition, but the crosslinking agent which may be used is not limited thereto.

A multifunctional crosslinking agent, for example, may be included at a range of 0.01 to 10 parts by weight or 0.01 to 5 parts by weight with respect to 100 parts by weight of the block copolymer in the pressure-sensitive adhesive composition, and with the multifunctional crosslinking agent in the above range, a gel fraction, cohesive force, pressure-sensitive adhesive force, durability, or the like of the pressure-sensitive adhesive may be excellently maintained.

The pressure-sensitive adhesive composition may include a silane coupling agent. Examples of the silane coupling agent may include a silane coupling agent having a beta-cyano group or acetoacetyl group.

The above-described silane coupling agent, for example, may allow the pressure-sensitive adhesive formed by the copolymer having a low molecular weight to exhibit excellent adhesive properties and bonding stability and to excellently maintain endurance reliability or the like under conditions of heat resistance and humidity and heat resistance.

As the silane coupling agent having a beta-cyano group or acetoacetyl group, for example, a compound represented by the following Formula 1 or 2 may be used.

 [Formula 1]

 [Formula 2]

In Formula 1 or 2, $R_1$ is a beta-cyanoacetyl group or beta-cyanoacetyl alkyl group, $R_3$ is an acetoacetyl group or acetoacetyl alkyl group, $R_2$ is an alkoxy group, n is an integer in the range of 1 to 3.

In Formula 1 or 2, the alkyl group may be an alkyl group having 1 to 20 carbon atoms, 1 to 16 carbon atoms, 1 to 12 carbon atoms, 1 to 8 carbon atoms, or 1 to 4 carbon atoms, and the alkyl group may be in the shape of a straight chain, a branched chain, or a ring. Further, in Formula 1 or 2, the alkoxy group may be an alkoxy group having 1 to 20 carbon atoms, 1 to 16 carbon atoms, 1 to 12 carbon atoms, 1 to 8 carbon atoms, or 1 to 4 carbon atoms, and the alkoxy group may be in the shape of a straight chain, a branched chain, or a ring.

Further, for example, n may be in the range of 1 to 3, 1 to 2, or 1 in Formula 1 or 2.

Examples of the compound of Formula 1 or 2 may include acetoacetylpropyl trimethoxy silane, acetoacetylpropyl triethoxy silane, beta-cyanoacetylpropyl trimethoxy silane, beta-cyanoacetylpropyl triethoxy silane, or the like, but are not limited thereto.

The silane coupling agent may be included at 0.01 to 5 parts by weight or 0.01 to 1 parts by weight with respect to 100 parts by weight of the block copolymer in the pressure-sensitive adhesive composition. With the silane coupling agent in the above range, desired physical properties may be effectively provided to the pressure-sensitive adhesive.

If necessary, the pressure-sensitive adhesive composition may further include a tackifier. For example, the tackifier may be, but is not limited to, one type or mixtures of two or more types selected from hydrocarbon resins, or hydrogenated hydrocarbon resins, rosin resins, or hydrogenated rosin resins, rosin ester resins, or hydrogenated rosin ester resins, terpene resins, or hydrogenated terpene resins, terpene phenol resins, or hydrogenated terpene phenol resins, polymerized rosin resins or polymerized rosin ester resins, etc. The tackifier may be included at an amount of 100 parts by weight or less with respect to 100 parts by weight of the block copolymer in the pressure-sensitive adhesive composition.

If necessary, the pressure-sensitive adhesive composition may also further include one or more additives selected from the group consisting of an epoxy resin, a curing agent, a UV light stabilizer, an antioxidant, a coloring agent, a reinforcing agent, a filler, an anti-foaming agent, a surfactant, and a plasticizer.

The pressure-sensitive adhesive composition may have a gel fraction of 80 weight % or less after a crosslinked structure is formed. The gel fraction may be calculated by the following Equation 1.

$$\text{Gel fraction (\%)} = B/A \times 100 \quad \text{[Equation 1]}$$

In Equation 1, A is a mass of the pressure-sensitive adhesive composition forming a crosslinked structure, and B is a dry mass of the insoluble fraction which is obtained by depositing the pressure-sensitive adhesive composition having a mass of A in ethyl acetate at room temperature for 72 hours, in a state in which the pressure-sensitive adhesive composition is allowed to stand in a sieve having a size of 200 mesh.

When the gel fraction is maintained in the range of 80% or less, workability, endurance reliability and re-workability may be excellently maintained. The lower limit of the gel fraction is not particularly limited, and for example, may be 0%. However, a gel fraction of 0% does not denote that the pressure-sensitive adhesive composition is not crosslinked at all. For example, the pressure-sensitive adhesive composition having the gel fraction of 0% may include the pressure-sensitive adhesive composition which is not crosslinked at all, or the pressure-sensitive adhesive composition in which crosslinking is formed to a certain degree, but the degree of crosslinking is so low that a gel is not maintained in the sieve having a size of 200 mesh and leaked.

The pressure-sensitive adhesive composition may be a pressure-sensitive adhesive composition for an optical film. The pressure-sensitive adhesive composition for an optical film, for example, may be used to laminate optical films such as a polarizing film, a retardation film, an anti-glare film, a viewing angle compensation film, a brightness enhancement film, or the like, or to attach the above-described optical films or laminates thereof to an adherend such as a liquid crystal panel. In the embodiment of the present applicant, the pressure-sensitive adhesive composition, which is as a pressure-sensitive adhesive composition for a polarizing plate, may be a pressure-sensitive adhesive composition used to attach the polarizing film to the liquid crystal panel.

According to another aspect of the present applicant, there is provided a pressure-sensitive adhesive optical laminate. An illustrative optical laminate may include an optical film; and a pressure-sensitive adhesive layer which is present on either or both sides of the optical film. The pressure-sensitive adhesive layer, for example, may be a pressure-sensitive adhesive layer to adhere the optical film to the liquid crystal panel of the LCD device or the like, or other optical films. Further, the pressure-sensitive adhesive layer may include the above-described pressure-sensitive adhesive composition of the present applicant. The pressure-sensitive adhesive composition may be included in the pressure-sensitive adhesive layer in a state in which a crosslinked structure is formed in the pressure-sensitive adhesive composition. Examples of the optical film may include laminates in which a polarizing film, a retardation film, a brightness enhancement film, or the like, or two types or more thereof are laminated.

According to another aspect of the present applicant, there is provided a pressure-sensitive adhesive polarizing plate. The polarizing plate, for example, may have a structure in which the optical film of the pressure-sensitive adhesive optical laminate is a polarizing film.

Types of the polarizing films included in the polarizing plate are not particularly limited, and for example, a general type which is well-known in the art such as a polyvinyl alcohol-based polarizing film or the like may be used without limitation.

A polarizing film is a functional optical film that may extract only light propagating in one direction from incident light which oscillates in various directions. The polarizing film as described above may be, for example, in the form of a polyvinyl alcohol-based resin film on which a dichroic dye is absorbed and oriented. The polyvinyl alcohol-based resin constituting the polarizing film may be obtained by a gelation of a polyvinyl acetate-based resin. Here, examples of the polyvinyl acetate-based resin capable of use may include a copolymer formed of other monomers copolymerizable with vinyl acetate and a homopolymer formed of vinyl acetate, as well as the homopolymer formed of vinyl acetate. Examples of the monomer copolymerizable with vinyl acetate may include one type or mixtures of two or more types selected from unsaturated carboxylic acid, an olefin, vinyl ether, unsaturated sulfonic acid, acrylamide having an ammonium group, or the like, but are not limited thereto. The degree of gelation of the polyvinyl alcohol-based resin typically ranges from 85 to 100 mol %, and is preferably 98 mol % or more. The polyvinyl alcohol-based resin may be additionally modified, for example, polyvinyl formal or polyvinyl acetal modified to a type of aldehyde may also be used. Further, the degree of polymerization of the polyvinyl alcohol-based resin generally ranges from about 1,000 to 10,000 or from about 1,500 to 5,000.

The polarizing film may be prepared via stretching (e.g., uniaxial stretching) the polyvinyl alcohol-based resin film, dyeing the polyvinyl alcohol-based resin film with dichroic dyes and absorbing such dichroic dyes thereon, treating the dichroic dye-absorbed polyvinyl alcohol-based resin film with a boric acid solution, and then cleaning the treated film. As the dichroic dye, iodine or a dichroic organic dye or the like may be used.

The polarizing plate may also further include the protective film adhered to either or both sides of the polarizing film, and in this case, the pressure-sensitive adhesive layer may be formed on one side of the protective film. A type of the protective film is not particularly limited, and for example, a film prepared by laminating one or more layers of cellulose-based films such as a triacetyl cellulose (TAC) film; a polyester-based film such as a polycarbonate or polyethylene terephthalate (PET) film; a polyethersulfone-based film; a polyolefin-based film prepared using a polyethylene film, a polypropylene film, a resin which is cyclo-based or has a norbornene structure or an ethylene propylene copolymer, etc. may be used.

The polarizing plate may further include one or more functional layers selected from the group consisting of a protective layer, a reflective layer, an anti-glare layer, a retardation layer, a viewing angle compensation layer, and a brightness enhancement film.

In an embodiment of the present applicant, a method of forming a pressure-sensitive adhesive layer on the polarizing plate or optical film as described above is not particularly limited, for example, a method of directly coating the polarizing plate or optical film with the pressure-sensitive adhesive composition and curing the composition to form a crosslinked structure, a method of coating a release-treated surface of a release film with the pressure-sensitive adhesive composition and curing the composition to form a crosslinked structure, and then transferring the cured composition to the polarizing plate or optical film, or the like may be used.

In the above descriptions, a method of coating the pressure-sensitive adhesive composition is not particularly limited, and for example, a method of coating the pressure-sensitive adhesive composition using a typical measure such as a bar coater or the like may be used.

In a coating process, it is preferable that the multifunctional crosslinking agent is controlled not to cause a crosslinking reaction of the functional group in terms of performing the uniform coating process, and whereby the crosslinking agent may form a crosslinked structure in a curing and aging process after the coating process to improve a cohesive force, pressure-sensitive adhesive physical properties, cuttability, or the like of the pressure-sensitive adhesive.

It is preferable that the coating process is performed after fully removing air bubble-inducing components such as a volatile component or reaction residue, and accordingly, the problems such as a decreased modulus of elasticity due to an excessively low crosslinking density, molecular weight, or the like, and a scatterer formed due to enlarged air bubbles present between the glass substrate and pressure-sensitive adhesive layer at a high temperature may be prevented.

A method of curing the pressure-sensitive adhesive composition to form a crosslinked structure following the coating process is not particularly limited, and for example, a method such as maintaining the coating layer at a suitable temperature to induce a crosslinking reaction of the block copolymer and multifunctional crosslinking agent in the coating layer may be used.

According to another aspect of the present applicant, there is provided a display device, for example, an LCD device. An illustrative display device may include a liquid crystal panel, and the polarizing plate or optical laminate adhered to either or both sides of the liquid crystal panel. The polarizing plate or optical laminate may be adhered to the liquid crystal panel using the above-described pressure-sensitive adhesive.

As the liquid crystal panel in the device, for example, all well-known panels such as a passive matrix panel such as a twisted nematic (TN) type, super twisted nematic (STN) type, ferroelectic (F) type, or polymer dispersed (PD) type; an active matrix panel such as a two terminal type, or three terminal type; an in plane switching (IPS) panel, vertical alignment (VA) panel, or the like may be applied.

Further, types of other components of the liquid crystal display device, for example, upper and lower part substrates such as a color filter substrate or array substrate are also not particularly limited, and components well known in the art may be used without limitation.

Effect

In the embodiment of the present applicant, the pressure-sensitive adhesive composition capable of forming the pressure-sensitive adhesive having an excellent cohesive force or stress relaxation properties, and thus having superior endurance reliability, light leakage suppression performance, or the like may be provided. The pressure-sensitive adhesive composition according to an embodiment of the present applicant, for example, may be used for the optical film such as the polarizing plate, or the like.

DETAILED DESCRIPTION OF ILLUSTRATIVE EMBODIMENTS

Hereinafter, the pressure-sensitive adhesive composition will be described in detail in conjunction with examples and comparative examples, but a scope of the pressure-sensitive adhesive composition is not limited to the following examples.

1. Molecular Weight Evaluation

A number average molecular weight (Mn) and molecular weight distribution (PDI) are measured using GPC under the following conditions, a calibration curve was formed using standard polystyrene of an Agilent system and a measurement result was converted.

[Measurement Conditions]

Measuring device: Agilent GPC (Agilent 1200 series, U.S.)

Column: 2—PL Mixed B connected

Column temperature: 40° C.

Eluent: THF (tetrahydrofuran)

Flow velocity: 1.0 mL/min

Concentration: ~1 mg/mL (100 μL injection)

2. Solid Fractions of Coating Material

Solid fractions of the coating material were evaluated using the following method.

[Measurement Order of Solid Fractions of Coating Material]

1) A weight A of an aluminum dish was measured.
2) About 0.3 to 0.5 g (specimen before drying) of the pressure-sensitive adhesive composition prepared in examples or comparative examples is collected and put into the aluminum dish.
3) A thimbleful of a polymerization inhibitor (hydroquinone) solution dissolved in ethyl acetate (concentration: 0.5 wt %) was added to the pressure-sensitive adhesive composition using a pipette.
4) The pressure-sensitive adhesive composition was dried in an oven at 150° C. for 30 minutes to remove a solvent, etc.
5) The pressure-sensitive adhesive composition was cooled down at room temperature for 15 to 30 minutes, and a weight of residual components thereof (weight of the specimen after drying) was measured.
6) The solid fractions of the coating material were evaluated using the following expression according to the measurement result.

$$\text{Solid fractions of coating material(unit: \%)} = 100 \times (DS-A)/(S+E) \quad \text{[Expression]}$$

DS: weight of aluminum dish A+weight of specimen after drying (unit: g)
A: weight of aluminum dish (unit: g)
S: weight of specimen before drying (unit: g)
E: weight of removed components (solvent, etc.) (unit: g)

3. Viscosity Evaluation

A viscosity of the pressure-sensitive adhesive composition was evaluated using the measuring device (Brookfield digital viscometer (DV-I+, DV-II+Pro)) according to the following method.

[Measurement Order of Viscosity]

1) 180 mL of the pressure-sensitive adhesive composition (sample) was put into a beaker, and then allowed to stand under conditions of a constant temperature and constant humidity (23° C./relative humidity of 50%) for about 1 hour to remove air bubbles.
2) A spindle was obliquely put into the pressure-sensitive adhesive composition (sample) such that a liquid surface of the sample was not deeper than a groove of the spindle, and air bubbles were not generated.
3) The spindle was connected to a viscometer, and the liquid surface of the sample was adjusted to match with the groove of the spindle.
4) A set speed key was pressed to select an rpm of the spindle.
5) A motor on/off key was pressed to operate the viscometer. The viscosity value was obtained after the viscosity value shown on the screen was stabilized. The rpm having about 10% or more of a confidence interval was searched for and fixed to measure the viscosity.

4. Coating Properties Evaluation

The pressure-sensitive adhesive compositions prepared in the examples and comparative examples were coated, and a coating layer was observed by visual inspection to evaluate according to the following standard.

[Evaluation Standard]

A: Air bubbles and stripes or the like on the coating layer are not determined by visual inspection
B: Air bubbles and stripes or the like on the coating layer are slightly determined by visual inspection.
C: Air bubbles and stripes or the like on the coating layer are clearly determined by visual inspection.

5. Durability Evaluation

The polarizing plates prepared in the examples and comparative examples were cut to have a width of about 180 mm and a length of about 320 mm to prepare specimens, and the specimens were adhered to commercial 19-inch panels. Then, the panels were stored in an autoclave (50° C., 5 atm) for about 20 minutes to prepared samples. Heat and humidity resistance durability of the prepared samples was evaluated based on the following standard after the samples were allowed to stand under conditions of 60° C. and relative humidity of 90% for 500 hours and observed for a generation of air bubbles and peeling. Heat resistance durability was also evaluated based on the following standard after the samples were maintained at 80° C. for 500 hours and then observed for a generation of air bubbles and peeling.

Further, room temperature low humidity durability after heat and humidity resistance was evaluated based on the following standard after the samples which passed through an evaluation of heat and humidity resistance durability were maintained under conditions of 25° C. and relative humidity of 25% for 30 days and then observed for a generation of air bubbles and peeling.

[Evaluation Standard]

A: No air bubbles and peeling were generated
B: Air bubbles and/or peeling were slightly generated
C: Air bubbles and/or peeling were largely generated 6. Calculation of Glass Transition Temperature A glass transition temperature (Tg) of each block or the like of the block copolymer was calculated according to the following expression.

$$1/Tg = \Sigma Wn/Tn \quad \text{[Expression]}$$

where Wn is a weight fraction of a monomer used in each block or the like, and Tn denotes a glass transition temperature shown when the used monomer forms a homopolymer.

That is, in the expression, the right side shows a result of a sum of values calculated after calculating a value (Wn/Tn) of dividing the weight fraction of the used monomer by the glass transition temperature shown when the used monomer forms a homopolymer for every monomer.

7. Measurement of Conversion Factor and Composition Ratio of Monomer

A conversion factor in the polymerization process of methyl methacrylate (MMA) which is a main monomer forming a first block in the block copolymer of the examples and comparative examples and butyl acrylate (BA) which is a main monomer forming a second block in the block copolymer of the examples and comparative examples, and composition contents in the block copolymer were calculated with the following expression according to the result of $^1$H-NMR.

[Conversion Factor of MMA]

$$\text{MMA conversion factor (\%)} = 100 \times B/(A+B)$$

where A is an area of a peak (near 3.4 ppm to 3.7 ppm) derived from a methyl group induced by MMA included in the polymer in $^1$H-NMR spectra, and B is an area of a peak (near 3.7 ppm) derived from a methyl group of MMA which is not polymerized. That is, in consideration of the movement position of the peak of the methyl group in the structure of MMA, the conversion factor of the monomer was calculated.

[Conversion Factor of BA]

BA conversion factor (%)=100×C/(C+D)

where D is an area of a peak (near 5.7 ppm to 6.4 ppm) derived from =CH$_2$ of a double bond end of BA in $^1$H-NMR spectra, C is an area of a peak (near 3.8 ppm to 4.2 ppm) derived from —OCH$_2$— present in the polymer formed by polymerization of BA. That is, the conversion factor was measured by calculating the relative value of the peak of =CH$_2$ by a double bonded of BA and the peak of —OCH$_2$— of the polymer.

[Calculation of Composition Ratio]

The ratio of the first and second block of the block copolymer were calculated based on the following expression according to the ratio of methyl methacrylate (MMA) and butyl acrylate (BA) which are the main monomers used to form the first block and second block.

MMA contents in block copolymer (%)=100×MMA peak area/BA peak area [Expression]

In the above description, the MMA peak area is the value of an area per a $^1$H proton of the peak near 3.4 to 3.7 ppm in the $^1$H-NMR (peak observed for —CH$_3$ derived from MMA), and the BA peak area is the value of an area per $^1$H proton of the peak near 3.8 to 4.2 ppm in the $^1$H-NMR (peak observed for —OCH$_2$— present in the polymer formed by BA).

That is, the weight ratio of the first and second block was computed by calculating the relative value of the —CH$_3$ peak of the MMA structure and the —OCH$_2$— peak of the polymer formed from BA azobis(2,4-dimethyl valeronitrile) (V-65) were put into the mixture in which the oxygen was removed, immersed in a reactor of about 67° C. to perform a reaction (polymerization of the first block). When a conversion factor of methylmethacrylate became about 75%, a mixture of 310 g of butyl acrylate (BA), 1.6 g of hydroxybutyl acrylate (HBA) and 500 g of ethyl acetate (EAc) which were bubbled with nitrogen in advance was put therein in the presence of nitrogen. Thereafter, 0.006 g of CuBr$_2$, 0.012 g of TPMA, and 0.05 g of V-65 were put into the reaction flask, a chain extension reaction was performed (polymerization of the second block). When a conversion factor of the monomer (BA) reached 80% or more, the reaction mixture was exposed to oxygen, and the reaction was brought to an end by diluting with a suitable solvent to prepare the block copolymer (V-65 was suitably divided and put until the end of the reaction in the process in consideration of the half-life thereof).

Preparation Examples 2 to 7. Preparation of Block Copolymers A2 to A4, and B1 to B3

Each block copolymer as shown in the following Table 1 was prepared in the same manner as in Preparation Example 1 except that types of raw materials (monomer) and polymerization conditions were adjusted upon polymerization of the block copolymer.

TABLE 1

| | | Preparation Example | | | | | | |
|---|---|---|---|---|---|---|---|---|
| | | 1<br>A1 | 2<br>A2 | 3<br>A3 | 4<br>A4 | 5<br>B1 | 6<br>B2 | 7<br>B3 |
| First block | MMA ratio | 100 | 80 | 60 | 70 | 80 | 60 | 81 |
| | BMA ratio | 0 | 20 | 40 | 30 | 20 | 40 | 16 |
| | HPMA ratio | 0 | 0 | 0 | 0 | 0 | 0 | 3 |
| | Tg (° C.) | 110 | 90 | 72 | 80 | 90 | 72 | 90 |
| | Mn (×10000) | 2.9 | 3.2 | 4.1 | 4.3 | 0.4 | 1.7 | 2.3 |
| | PDI | 1.37 | 1.44 | 1.38 | 1.41 | 1.21 | 1.32 | 1.36 |
| Second block | BA ratio | 99.5 | 97.0 | 94.0 | 95.0 | 97.0 | 95.0 | 100 |
| | HBA ratio | 0.5 | 3.0 | 6.0 | 5.0 | 3.0 | 5.0 | 0 |
| | Tg (° C.) | −47 | −46.2 | −47.5 | −47.0 | −46.2 | −47.0 | −45 |
| Block copolymer | Mn (×10000) | 23.7 | 27.3 | 33.5 | 37.4 | 2.3 | 10.4 | 12.2 |
| | PDI | 2.8 | 3.1 | 3.3 | 4.1 | 1.4 | 2.2 | 1.8 |

Ratio unit: parts by weight
Tg: glass transition temperature
Mn: number average molecular weight
PDI: molecular weight distribution
BA: butyl acrylate (homopolymer Tg: about −45° C.)
HBA: 4-hydroxybutyl acrylate (homopolymer Tg: about −80° C.)
MMA: methyl methacrylate (homopolymer Tg: about 110° C.)
BMA: butyl methacrylate (homopolymer Tg: about 27° C.)
HPMA: 2-hydroxypropyl methacrylate (homopolymer Tg: about 26° C.)

Preparation Example 1. Preparation of Block Copolymer A 0.1 g of ethyl 2-bromoisobutyrate (EBiB) and 28.4 g of methylmethacrylate (MMA) were mixed in 12.4 g of ethyl acetate (EAc). A flask containing the mixture was sealed with a rubber stopper, purged with nitrogen at about 25° C. for about 30 minutes with stirring, and dissolved oxygen was removed by bubbling. Then, 0.002 g of CuBr$_2$, 0.005 g of tris(2-pyridylmethyl)amine (TPMA), and 0.017 g of 2,2'-

Preparation Example 8. Preparation of Random Copolymer C1

10 parts by weight of methyl methacrylate (MMA), 87.3 parts by weight of n-butyl acrylate, and 2.7 parts by weight of 4-hydroxybutyl acrylate were put into a 1 L-reactor refluxing nitrogen gas and equipped with a cooling device to facilitate control of the temperature, and then 120 parts by weight of ethyl acetate as a solvent was put therein. Subsequently, the reactor was purged with a nitrogen gas to remove oxygen for about 60 minutes, 0.05 parts by weight of azobisisobutyronitrile (AIBN) which is a reaction initiator was put into the reactor while a temperature was maintained at 60° C., the reaction was performed for about 8 hours with adjusting polymerization conditions to ensure the molecular weight and molecular weight distribution as described below, and thereby a random copolymer was prepared. The prepared random copolymer C1 has a number average molecular weight (Mn) of about 232,000, and a molecular weight distribution (PDI) of about 4.9.

Example 1

Preparation of Coating Solution (Pressure-Sensitive Adhesive Composition)

0.05 parts by weight of the crosslinking agent (Coronate L; manufactured by Nippon Polyurethane Industry Co. Ltd.), 0.1 parts by weight of dibutyltin dilaurate (DBTDL), and 0.2 parts by weight of a silane coupling agent having a beta-cyanoacetyl group were mixed with respect to 100 parts by weight of the block copolymer A1 prepared in Preparation Example 1, ethyl acetate as a solvent was also mixed, the mixture was adjusted such that solid fractions of a coating solution became about 30 wt %, and thereby a coating solution (pressure-sensitive adhesive composition) was prepared.

Preparation of Pressure-Sensitive Adhesive Polarizing Plate

The prepared coating solution was coated on a release-treated surface of the release polyethylene terephthalate (PET) film with a thickness of 38 μm (MRF-38, manufactured by Mitsubishi Chemical Corporation), and then maintained in an oven at 110° C. for about 3 minutes such that a coating layer having a thickness of about 23 μm was formed after drying. After drying, the pressure-sensitive adhesive layer formed on the release PET film was laminated on a wide view (WV) liquid crystal layer of a polarizing plate (laminated structure: TAC/PVA/TAC, TAC=triacetyl cellulose film, PVA=polyvinyl alcohol-based polarizer film), one side of which was coated with the WV liquid crystal layer, and thereby a pressure-sensitive adhesive polarizing plate was prepared.

Examples 2 and 4, Comparative Examples 1 to 5

The pressure-sensitive adhesive composition (coating solution) and pressure-sensitive adhesive polarizing plate were prepared in the same manner as in Example 1 except that each component and ratio were adjusted as shown in the following Table 2 upon a preparation of the pressure-sensitive adhesive composition (coating solution).

TABLE 2

| | | Example | | | | Comparative Example | | | | |
|---|---|---|---|---|---|---|---|---|---|---|
| | | 1 | 2 | 3 | 4 | 1 | 2 | 3 | 4 | 5 |
| Block copolymer | Type | A1 | A2 | A3 | A4 | B1 | B2 | B2 | C1 | B3 |
| | Content | 100 | 100 | 100 | 100 | 100 | 100 | 100 | 100 | 100 |
| Content of crosslinking agent | | 0.1 | 0.1 | 0.1 | 0.1 | 0.1 | 0.1 | 0.2 | 0.2 | 0.1 |
| Content of DBTDL | | 0.1 | 0.1 | 0.1 | 0.1 | 0.1 | 0.1 | 0.2 | 0.2 | 0.1 |
| Content of SCA | | 0.2 | 0.2 | 0.2 | 0.2 | 0.2 | 0.2 | 0.2 | 0.2 | 0.2 |

Content unit: parts by weight
Crosslinking agent: Coronate L (manufactured by Nippon Polyurethane Industry Co. Ltd.)
DBTDL: Dibutyltin dilaurate
SCA: silane coupling agent having β-cyanoacetyl group (M812, manufactured by LG Chem, Ltd)

The evaluation result of physical properties of each example and comparative example is shown in the following Table 3.

TABLE 3

| | Example | | | | Comparative Example | | | | |
|---|---|---|---|---|---|---|---|---|---|
| | 1 | 2 | 3 | 4 | 1 | 2 | 3 | 4 | 5 |
| Coating properties | A | A | A | A | A | A | A | A | A |
| Heat resistance durability | A | A | A | A | C | B | A | A | C |
| Heat and humidity resistance durability | A | A | A | A | B | A | A | B | C |
| Room temperature low humidity durability | A | A | A | A | C | C | C | C | C |

What is claimed is:

1. A pressure-sensitive adhesive laminate, comprising:
a film selected from the group consisting of an optical film and a polarizing film; and
a pressure-sensitive adhesive layer which is present on one side or both sides of the film, and includes a pressure-sensitive adhesive composition in which a crosslinked structure is formed, where the pressure-sensitive adhesive composition comprises:
a diblock copolymer having a first block having a glass transition temperature of 50° C. or more, wherein the first block comprises a polymerization unit derived from a methacrylic acid ester monomer; and a second block having a crosslinkable functional group and a glass transition temperature of −10° C. or less, wherein the second block comprises a polymerization unit derived from acrylic acid ester monomer and copolymerizable monomer having the crosslinkable functional group,
wherein the diblock copolymer has a number average molecular weight in a range of 200,000 to 374,000 and has a molecular weight distribution ranging from greater than 2.5 to 5.0.

2. The pressure-sensitive adhesive laminate of claim 1, wherein the first block has a number average molecular weight in a range of 10,000 to 250,000.

3. The pressure-sensitive adhesive laminate of claim 1, wherein the diblock copolymer has a room temperature viscosity of 3,000 cP or more in a state in which the diblock copolymer is diluted with ethyl acetate such that contents of solid fractions of the block copolymer are 30 wt %.

4. The pressure-sensitive adhesive laminate of claim 1, wherein a crosslinkable functional group is not included in the first block, and only included in the second block.

5. The pressure-sensitive adhesive laminate of claim 1, wherein the crosslinkable functional group is a hydroxy group.

6. The pressure-sensitive adhesive laminate of claim 1, wherein the second block comprises a polymerization unit derived from 90 to 99.9 parts by weight of the acrylic acid ester monomer, and 0.1 to 10 parts by weight of the copolymerizable monomer having the crosslinkable functional group.

7. The pressure-sensitive adhesive laminate of claim 1, further comprising a crosslinking agent which has two or more functional groups capable of reacting with the crosslinkable functional group.

8. The pressure-sensitive adhesive laminate of claim 7, wherein the crosslinking agent is included at a range of 0.01 parts by weight to 10 parts by weight with respect to 100 parts by weight of the block copolymer.

9. A display device comprising the pressure-sensitive adhesive laminate of claim 1, wherein the film is the optical film.

10. A display device comprising the pressure-sensitive adhesive plate of claim 1, wherein the film is the polarizing film.

\* \* \* \* \*